United States Patent [19]

Naito

[11] Patent Number: 4,475,608

[45] Date of Patent: Oct. 9, 1984

[54] WEIGHT DETECTION CIRCUIT FOR A LOAD CELL SCALE

[75] Inventor: Kazufumi Naito, Yanagasaki, Japan

[73] Assignee: Kabushiki Kaisha Ishida Koki Seisakusho, Kyoto, Japan

[21] Appl. No.: 385,123

[22] Filed: Jun. 4, 1982

[30] Foreign Application Priority Data

Jun. 16, 1981 [JP] Japan .................................. 56-93129

[51] Int. Cl.³ .......................... G01G 3/14; G01L 5/12; G01L 1/22
[52] U.S. Cl. .................................. 177/211; 73/862.67; 338/3
[58] Field of Search ..................... 177/211; 73/862.67; 338/2, 3

[56] References Cited

U.S. PATENT DOCUMENTS 3,831,687  8/1974  Maffia et al. ......................... 177/211
4,177,868 12/1979  Sanders et al. .................... 73/862.67

Primary Examiner—George H. Miller, Jr.
Attorney, Agent, or Firm—Lowe, King, Price & Becker

[57] ABSTRACT

A weight detection circuit for a load cell scale which connects an operational amplifier directly to an-output of a bridge circuit of a load cell so as to simplify a conventional differential amplifier, thereby enabling simplification of the overall weight detection circuit to result in a reduction in manufacturing cost. Furthermore, a bias resistance is connected directly to the bridge circuit for the load cell thereby also to simplify the bias circuit to lead to a further reduction in manufacturing cost.

6 Claims, 4 Drawing Figures

WEIGHT DETECTION CIRCUIT FOR A LOAD CELL SCALE

FIELD OF THE INVENTION

This invention relates to a weight detection circuit for a load cell scale.

BACKGROUND OF THE INVENTION

A conventional weight detection circuit for the load cell scale, as shown in FIG. 1, provides an output of a bridge circuit 1 of a strain gauge resistance of the load cell, that is, an analog voltage proportional to weight, to a high-input-impedance differential amplifier 2 (e.g., an instrumentation amplifier), the output thereof being provided to an A-D converter 4 through a bias circuit 3. In addition, resistances $R_0$ at the bridge circuit 1 serve as temperature-compensating resistances for the load cell.

Here, an output voltage $V_{out}$ of the high-input-impedance differential amplifier 2 is represented by the following equation:

$$V_{out} = (V_1 - V_2)\alpha \qquad 1$$

where $V_1$, $V_2$ are output voltages of bridge circuit 1, and a is an amplification factor of the high-input-impedance differential amplifier 2.

A node equation is set up at each node of bridge circuit 1 and solved to obtain the following equation:

$$V_1 - V_2 = -\frac{\Delta R}{R + 2R_0}(V_a - V_b) \qquad 2$$

where
R is the strain gauge resistance at zero weight,
$\Delta R$ is a change in resistance proportional to weight
$V_a$, $V_b$ are present on applied voltage, and
$R_0$ is a temperature compensating resistance.

When Equation 2 is substituted into Equation 1, the following equation is obtained $$V_{out} = -\frac{\Delta R}{R + 2R_0}(V_a - V_b)\alpha \qquad 3$$

In a case that the weight detection circuit for the load cell scale is constructed as the above, since the output of bridge circuit 1 is amplified by the high-input-impedance differential amplifier 2, the circuit 2 is substantially isolated, so that the temperature characteristics of (a) four strain gauge resistances ($R \pm \Delta R$) at the bridge circuit 1, (b) a feedback resistance $R_f$ and an input resistance $R_i$ at the high-input-impedance differential amplifier 2, (c) two voltage-dividing resistances $R_{d1}$ and $R_{d2}$ thereof, and (d) three resistances $R_{b1}$, $R_{b2}$ and $R_{b3}$ at the amplifier 2, need to be considered only within each group (a), (b), (c) or (d), but need not be considered together for the whole circuit thereby facilitating the design. However, the number of parts in such a circuit increases so that the conventional weight detection circuit is defective in a high manufacturing cost.

SUMMARY OF THE INVENTION

In the light of the above conventional problem, this invention has been designed. This invention is characterized mainly in that an operational amplifier is connected directly to an output of a bridge circuit for a strain gauge resistance of the load cell, and that a feedback resistance is made equal to a voltage-dividing resistance at the ground side so that a circuit is provided which is equivalent to a differential amplifier having an amplification factor of $2R_1/R$ (where R is a reference resistance value of strain gauge resistance when the weight is zero, and $R_1$ is a feedback resistance or voltage-dividing resistance at the ground side).

A main object of the invention is to provide a weight detection circuit constructed as described in the foregoing, thereby simplifying the conventional differential amplifier to lead to simplification of the weight detection circuit as a whole and a low manufacturing cost.

Furthermore, this invention is characterized in that a bias resistance is connected to the bridge circuit of the load cell at the weight detection circuit constructed as described so that the predetermined bias voltage which is derived from the node equation can be obtained, whereby the bias circuit as well as the high-input-impedance differential amplifier is intended to be simplified, thus simplifying the weight detection circuit as a whole and reducing the manufacturing cost thereof.

These and other objects of the invention will become more apparent in the detailed description and examples which follow.

DETAILED DESCRIPTION OF THE INVENTION

Figures 1, 2:
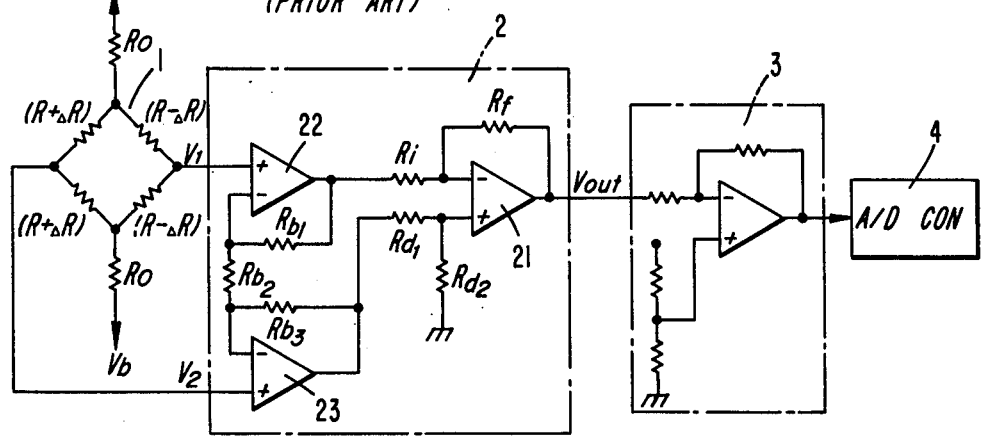
FIG. 1 is a view of a conventional weight detection circuit for a load cell scale.
FIG. 2 is a view of an embodiment of a weight detection circuit of the invention, in which a high-input-impedance differential amplifier is simplified, and FIGS. 3a and b are views of modified embodiment, in which a bias circuit is simplified.

In the embodiment shown in FIG. 2, operational amplifiers 22 and 23, resistances $R_{b1}$, $R_{b2}$ and $R_{b3}$, input resistance $R_i$, and voltage-dividing resistance $R_{d1}$ at the non-ground side, are omitted from the high-impedance-input differential amplifier 2 shown in FIG. 1, and a feedback resistance $R_f$ is made equal in resistance value to a voltage-dividing resistance $R_{d2}$ at the ground side. In other words, an output of a bridge circuit 1 is provided directly to an operational amplifier 21 and the aforesaid resistances have a relation of $R_f = R_{d2} = R_1$.

The circuit in FIG. 2, when the node equation at each node of the bridge circuit is set up and solved, obtains an output represented by the following equation.

$$V_{out} = -\frac{R_1 \cdot 2\Delta R}{R_0 \cdot 2R + R^2 - \Delta R^2}\cdot(V_a - V_b) \qquad 4$$

where $R_1 = R_f = R_{d2}$. Here, $\Delta R^2$ may be neglected since $R^2 >> \Delta R^2$, therefore $$V_{out} = -\frac{\Delta R}{R + 2R_0}\cdot(V_a - V_b)\cdot\frac{2R_1}{R} \qquad 5$$

is obtained. When Equation 5 is compared with Equation 3, it is understandable that this circuit acts as a differential amplifier having an equivalent amplification factor of $2R_1/R$.

This invention also is necessary to define the temperature characteristics of each strain gauge resistance at the bridge circuit, feedback resistance $R_f$ at the operational amplifier 21 side, and voltage-dividing resistance $R_{d2}$. The strain gauge resistance, however, is generally described by a stable temperature characteristic. Hence, the conventional strain gauge resistance is used as is. Thus, by providing for the feedback resistance $R_f$ and voltage-dividing resistance $R_{d2}$ to have identical temperature characteristics with the strain gauge resistance, a weight detection circuit is obtained having extremely superior temperature characteristic as a whole and having a reduced number of parts.

Figure 3A:
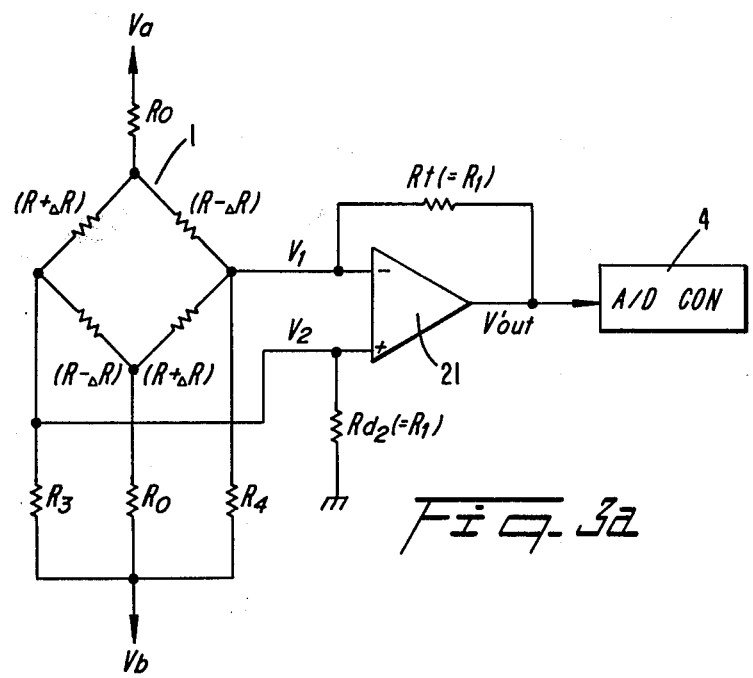
Figure 3B:
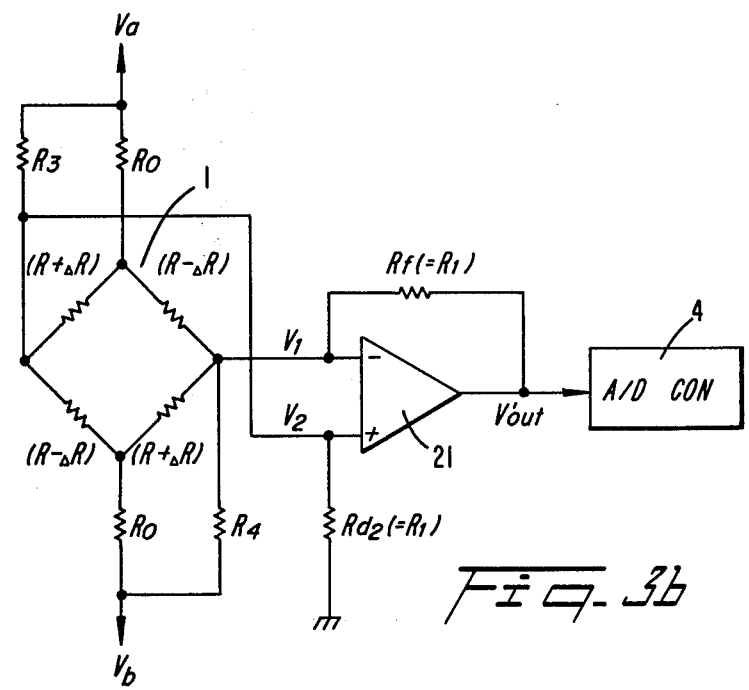

Next, in FIGS. 3-(a) and -(b), a bias circuit 3 at the last stage also is omitted from the FIG. 2 embodiment, in which the bridge circuit 1 is connected at its two output lines with applied voltage $V_a$ and $V_b$ though bias resistances $R_3$ and $R_4$. In FIG. 3-(a), only $V_b$ is used as a bias power source and in FIG. 3-(b), $V_a$ and $V_b$ are used as the bias power source.

For example, in FIG. 3-(a), the node equation is set up at each node of bridge circuit 1 and solved to obtain an output voltage $V'_{out}$ of operational amplifier 21 as follows:

$$V'_{out} = -R_1 \frac{2\Delta R}{2R \cdot R_0 + R^2 - \Delta R^2}(V_a - V_b) + \frac{R_1}{R_3} V_b -$$

$$\frac{R_1}{R_4} V_b + \frac{R_1^2\left(\frac{1}{R_3} + \frac{1}{R_4}\right)}{2R \cdot R_1 \cdot R_3 + (2R \cdot R_0 + R^2 - \Delta R^2)(R_1 + R_3)} \times$$

$$\{(2R \cdot R_0 + R^2 - \Delta R^2)V_b + R_3(R - \Delta R)V_a + R_3(R + \Delta R)V_b\}$$

where, $R^2$ is neglected due to $R^2 >> \Delta R^2$, then $$V'_{out} \approx \left[-\frac{2R_1}{R} \cdot \frac{\Delta R}{(R + 2R_0)}(V_a - V_b)\right] +$$

$$\left[\frac{R_1}{R_3} V_b - \frac{R_1}{R_4} V_b\right] +$$

$$\left[\frac{R_1^2\left(-\frac{1}{R_3} + \frac{1}{R_4}\right)}{2R_1R_3 + (R + 2R_0)(R_1 + R_3)} \{(R + 2R_0)V_b +$$

$$R_3(V_a + V_b)\}\right] - \left[\frac{R_2\left(-\frac{1}{R_3} + \frac{1}{R_4}\right)}{2R_1R_3 + (R + 2R_0)(R_1 + R_3)} \cdot \right.$$

$$\left.\frac{\Delta R}{R} R_3(V_a - V_b)\right]$$

is obtained. Since the first term in Equation 7 is equal to Equation 5, this term represents an amplified voltage representative of the weight signal component and the second and third terms are constant to represent bias voltage. The fourth term including $\Delta R$ represents an error voltage. An error rate $\epsilon$ is obtained by use of a ratio of the 1st term to the 4th term, as follows:

$$\epsilon = \frac{(R + 2R_0)\left(\frac{R_3}{R_4} - 1\right)}{2\left\{2R_3 + (R + 2R_0)\left(1 + \frac{R_3}{R_1}\right)\right\}}$$

Values of $R_1$, $R_3$ and $R_4$ are selected to make the error rate $\epsilon$ smaller than the accuracy (accuracy=minimum scale/maximum scalable capacity=constant), whereby the 4th term of Equation 7 is made negligible. Hence, this circuit has an operational function sufficient for the weight detection circuit.

Furthermore, in FIG. 3-(b), the node equation is set up to obtain $V'_{out}$ as follows:

$$V'_{out} \approx \left[-\frac{2R_1}{R} \cdot \frac{\Delta R}{R + 2R_0} \cdot (V_a - V_b)\right] + \left[\frac{R_1}{R_3} V_a - \right.$$

$$\left.\frac{R_1}{R_4} V_b\right] + \left[\frac{R_1^2\left(-\frac{1}{R_3} + \frac{1}{R_4}\right)}{2R_1R_3 + (R + 2R_0)(R_1 + R_3)} \{(R + \right.$$

$$\left.2R_0)V_a + R_3(V_a + V_b)\}\right] - \left[\frac{R_1^2\left(-\frac{1}{R_3} + \frac{1}{R_4}\right)}{2R_1R_3 + (R + 2R_0)(R_1 + R_3)} \cdot \right.$$

$$\left.\frac{\Delta R}{R} R_3(V_a - V_b)\right]$$

Equation 9, similarly to Equation 7, represents at the first term an amplified voltage for the weight signal component, at the second and third terms a bias voltage, and at the 4th term an error voltage. Hence, a ratio of first term to fourth term, i.e., an error rate $\epsilon$, is obtained similarly to Equation 8 so that $R_1$, $R_3$ and $R_4$ may be selected to make the error rate $\epsilon$ smaller than the accuracy of the scale.

In addition, Equations 7 and 9 are rearranged to replace the 2nd and 3rd terms $$\left[\frac{R_1}{R_3} V_{x1} - \frac{R_1}{R_4} V_{x2}\right] +$$

$$\left[\frac{R_1^2\left(-\frac{1}{R_3} + \frac{1}{R_4}\right)}{2R_1R_3 + (R + 2R_0)(R_1 + R_3)} \{(R + 2R_0)V_{x1} + \right.$$

$$\left.R_3(V_a + V_b)\}\right]$$

respectively, in which $V_{x1}$ represents an applied voltage at the resistance $R_4$ connected side and $V_{x2}$ represents that at the resistance $R_4$ connected side. Hence, $V_{x1}=V_{x2}=V_b$ in Equation 7, and $V_{x1}=V_a$ and $V_{x2}=V_b$ in Equation 9, are found.

Furthermore, in the two examples of FIGS. 3-(a) and -(i), two bias resistances $R_3$ and $R_4$ have to be selected not to affect the temperature characteristic of the strain gauge resistance.

As seen from the above, the weight detection circuit for the load cell scale of the invention can simplify the high-input-impedance differential amplifier to thereby simplify the weight detection circuit, lower the manufacturing cost, and further simplify the bias circuit, thus improving the aforesaid effect.

While a preferred embodiment of the invention has been described using specific terms, such description is for illustrative purpose only, and it is to be understood that changes and variations may be made without departing from the spirit or scope of the following claims.

What is claimed is:

1. A weight detection circuit for a load cell scale, comprising a bridge circuit for a strain gauge resistance of the load cell, an operational amplifier connected substantially directly to an output of said bridge circuit, a feedback resistance connecting a negative input line and an output line of said operational amplifier, and a voltage-dividing resistance being connected between a positive input line of said operational amplifier and ground, said voltage dividing resistance being substantially equal to said feedback resistance.

2. A weight detection circuit for a load cell scale, comprising a bridge circuit for a strain gauge resistance of the load cell, an operational amplifier connected substantially directly to an output of said bridge circuit, a feedback resistance connecting a negative input line and an output line of said operational amplifier, a voltage-dividing resistance being connected between a positive input line of said operational amplifier and ground, said voltage dividing resistance being substantially equal to said feedback resistance, and bias resistances connected to two output terminals of said bridge circuit.

3. A weight detection circuit for a load scale according to claim 2, wherein values of said bias resistances are selected so that an error rate obtained from a node equation describing operation of said bridge circuit is less than the accuracy of said scale.

4. A temperature corrected weight detection circuit for a load cell scale, comprising:
    a bridge circuit for a strain gauge resistance of the load cell, said bridge circuit having four nodes, one pair of said nodes connected to a pair of reference voltage levels, said bridge circuit providing a pair of output signals from another pair of nodes thereof,
    an operational amplifier having inverting and noninverting input terminals and an output terminal,
    temperature compensation circuit means comprising a resistive network connecting said one pair of nodes of said bridge circuit to said reference voltage levels,
    means for providing substantially direct connection of said inverting and noninverting input terminals of said operational amplifier to said another pair of nodes of said bridge circuit,
    a feedback resistor connecting said inverting input terminal of said operational amplifier and said output terminal of said operational amplifier, and a voltage divider resistor connected between said noninverting input terminal of said operational amplifier and ground, said voltage dividing resistor having a resistance substantially equal to the resistance of said feedback resistor.

5. In a temperature compensated weight detection circuit for a load cell scale having a bridge circuit for a strain gauge resistance of the load cell, temperature compensating resistor means connecting said bridge to reference voltage means, an operational amplifier and an output utilization circuit, the improvement comprising:
    means for maintaining temperature compensation of said weight detection circuit including a substantially direct connection between output nodes of said bridge circuit and input terminals of said operational amplifier,
    feedback resistor means connecting an output of said operational amplifier to an inverting input thereof, and
    voltage dividing resistor means connecting a noninverting input of said operational amplifier to ground and having a resistance value substantially equal to the resistance of said feedback resistor means.

6. The improved weight detection circuit of claim 5 further comprising a substantially direct connection between an output of said operational amplifier and said output utilization circuit, and
    resistive network biasing means connecting the output nodes of said bridge circuit to reference voltage levels, having resistance values selected together with said feedback and voltage dividing resistor means to provide reduced error and increased accuracy in the output voltage provided by said bridge circuit.

* * * * *